(12) United States Patent
Lin

(10) Patent No.: US 6,621,773 B2
(45) Date of Patent: Sep. 16, 2003

(54) GLITCH PROTECTION METHOD IN OPTICAL STORAGE DEVICE

(75) Inventor: Meng-Fu Lin, Kaohsiung (TW)

(73) Assignee: Via Technologies, Inc., Taipei Hsien (TW)

( * ) Notice: Subject to any disclaimer, the term of this patent is extended or adjusted under 35 U.S.C. 154(b) by 392 days.

(21) Appl. No.: 09/801,329

(22) Filed: Mar. 7, 2001

(65) Prior Publication Data

US 2001/0026519 A1 Oct. 4, 2001

(30) Foreign Application Priority Data

Mar. 8, 2000 (TW) ......................................... 89104136 A (51) Int. Cl.$^7$ ............................................... G11B 7/00
(52) U.S. Cl. ................... 369/44.28; 369/30.14; 369/30.16; 369/53.28
(58) Field of Search ........................... 369/44.28, 30.16, 369/30.14, 53.28, 30.13

(56) References Cited

U.S. PATENT DOCUMENTS

| | | | | |
|---|---|---|---|---|
| 5,828,634 A | * | 10/1998 | Ohno et al. | 369/44.26 |
| 6,282,156 B1 | * | 8/2001 | Ma | 369/44.28 |
| 6,314,066 B1 | * | 11/2001 | Hong et al. | 369/44.28 |
| 6,377,523 B2 | * | 4/2002 | Yanagi | 369/44.28 |
| 6,501,714 B1 | * | 12/2002 | Takano et al. | 369/44.28 |

* cited by examiner

*Primary Examiner*—Doris H. To
*Assistant Examiner*—Gautam R. Patel
(74) *Attorney, Agent, or Firm*—J.C. Patents (57) ABSTRACT

A track seeking and track locking method in an optical storage device capable of computing protection intervals such that any state transition of the TEZC signal and the RFZC signal within the computed protection interval is prohibited. The method is also capable of preventing the interference of the TEZC and the RFZC signal due to glitches in the TE signal and the RFRP signal, thus reducing track errors and speed computational errors.

20 Claims, 6 Drawing Sheets

| te_tog_num / rf_tog_num | 0 | 1 | 2 | 3 |
|---|---|---|---|---|
| 0 | $a_{00}b_{00}c_{00}d_{00}$ $e_{00}f_{00}g_{00}h_{00}$ | $a_{01}b_{01}c_{01}d_{01}$ $e_{01}f_{01}g_{01}h_{01}$ | $a_{02}b_{02}c_{02}d_{02}$ $e_{02}f_{02}g_{02}h_{02}$ | $a_{03}b_{03}c_{03}d_{03}$ $e_{03}f_{03}g_{03}h_{03}$ |
| 1 | $a_{10}b_{10}c_{10}d_{10}$ $e_{10}f_{10}g_{10}h_{10}$ | $a_{11}b_{11}c_{11}d_{11}$ $e_{11}f_{11}g_{11}h_{11}$ | $a_{12}b_{12}c_{12}d_{12}$ $e_{12}f_{12}g_{12}h_{12}$ | $a_{13}b_{13}c_{13}d_{13}$ $e_{13}f_{13}g_{13}h_{13}$ |
| 2 | $a_{20}b_{20}c_{20}d_{20}$ $e_{20}f_{20}g_{20}h_{20}$ | $a_{21}b_{21}c_{21}d_{21}$ $e_{21}f_{21}g_{21}h_{21}$ | $a_{22}b_{22}c_{22}d_{22}$ $e_{22}f_{22}g_{22}h_{22}$ | $a_{23}b_{23}c_{23}d_{23}$ $e_{23}f_{23}g_{23}h_{23}$ |
| 3 | $a_{30}b_{30}c_{30}d_{30}$ $e_{30}f_{30}g_{30}h_{30}$ | $a_{31}b_{31}c_{31}d_{31}$ $e_{31}f_{31}g_{31}h_{31}$ | $a_{32}b_{32}c_{32}d_{32}$ $e_{32}f_{32}g_{32}h_{32}$ | $a_{33}b_{33}c_{33}d_{33}$ $e_{33}f_{33}g_{33}h_{33}$ |

FIG. 6

| te_tog_num / rf_tog_num | 0 | 1 | 2 | 3 |
|---|---|---|---|---|
| 0 | $a_{00}=3/4, b_{00}=0$ $c_{00}=1/8, d_{00}=0$ $e_{00}=0, f_{00}=1/8$ $g_{00}=0, h_{00}=3/4$ | $a_{01}=3/4, b_{01}=0$ $c_{01}=1/8, d_{01}=0$ $e_{01}=0, f_{01}=1/8$ $g_{01}=3/2, h_{01}=0$ | $a_{02}=3/4, b_{02}=0$ $c_{02}=1/8, d_{02}=0$ $e_{02}=1/4, f_{02}=0$ $g_{02}=3/2, h_{02}=0$ | $a_{03}=3/4, b_{03}=0$ $c_{03}=1/8, d_{03}=0$ $e_{03}=1/4, f_{03}=0$ $g_{03}=3/2, h_{03}=0$ |
| 1 | $a_{10}=0, b_{10}=3/2$ $c_{10}=1/8, d_{10}=0$ $e_{10}=0, f_{10}=1/8$ $g_{10}=0, h_{10}=3/4$ | $a_{11}=0, b_{11}=3/2$ $c_{11}=1/8, d_{11}=0$ $e_{11}=0, f_{11}=1/8$ $g_{11}=3/2, h_{11}=0$ | $a_{12}=0, b_{12}=3/2$ $c_{12}=1/8, d_{12}=0$ $e_{12}=1/4, f_{12}=0$ $g_{12}=3/2, h_{12}=0$ | $a_{13}=0, b_{13}=3/2$ $c_{13}=1/8, d_{13}=0$ $e_{13}=1/4, f_{13}=0$ $g_{13}=3/2, h_{13}=0$ |
| 2 | $a_{20}=0, b_{20}=3/2$ $c_{20}=0, d_{20}=1/4$ $e_{20}=0, f_{20}=1/8$ $g_{20}=0, h_{20}=3/4$ | $a_{21}=0, b_{21}=3/2$ $c_{21}=0, d_{21}=1/4$ $e_{21}=0, f_{21}=1/8$ $g_{21}=3/2, h_{21}=0$ | $a_{22}=0, b_{22}=3/2$ $c_{22}=0, d_{22}=1/4$ $e_{22}=1/4, f_{22}=0$ $g_{22}=3/2, h_{22}=0$ | $a_{23}=0, b_{23}=3/2$ $c_{23}=0, d_{23}=1/4$ $e_{23}=1/4, f_{23}=0$ $g_{23}=3/2, h_{23}=0$ |
| 3 | $a_{30}=0, b_{30}=3/2$ $c_{30}=0, d_{30}=1/4$ $e_{30}=1/4, f_{30}=1/8$ $g_{30}=0, h_{30}=3/4$ | $a_{31}=0, b_{31}=3/2$ $c_{31}=0, d_{31}=1/4$ $e_{31}=0, f_{31}=1/8$ $g_{31}=3/2, h_{31}=0$ | $a_{32}=0, b_{32}=3/2$ $c_{32}=0, d_{32}=1/4$ $e_{32}=1/4, f_{32}=0$ $g_{32}=3/2, h_{32}=0$ | $a_{33}=0, b_{33}=3/2$ $c_{33}=0, d_{33}=1/4$ $e_{33}=1/4, f_{33}=0$ $g_{33}=3/2, h_{33}=0$ |

FIG. 7

GLITCH PROTECTION METHOD IN OPTICAL STORAGE DEVICE

CROSS-REFERENCE TO RELATED APPLICATION

This application claims the priority benefit of Taiwan application serial no. 89104136, filed Mar. 8, 2000.

BACKGROUND OF THE INVENTION

1. Field of Invention

The present invention relates to a track seeking and track locking method in an optical storage device. More particularly, the present invention relates to a track seeking and track locking method that controls track error zero cross (TEZC) signal and radio frequency ripple zero cross (RFZC) signal for preventing state transition within a safety interval in an optical storage device.

2. Description of Related Art

Due to the rapid advance in data storage technologies, capacity-limited conventional magnetic disk storage system is gradually replaced by optical disk storage device, especially after rewritable optical storage devices are introduced.

Figure 1:
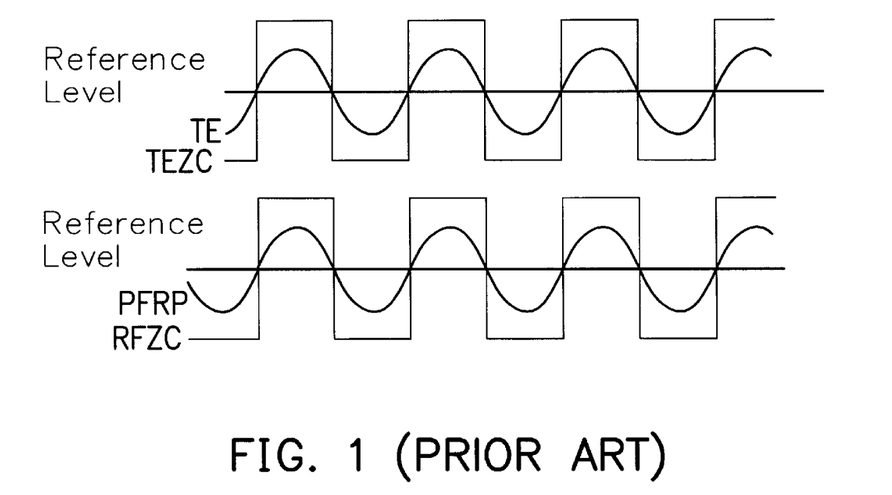
FIG. 1 is diagram showing the waveforms of TEZC and RFZC signals derived from the zero-crossing of the TE and RFRP signals.

For the track seeking and track locking processes in the conventional optical storage device, the sinusoidal or triangular track error (TE) signal and the radio frequency ripple (RFRP) signal has a phase difference of about 90° (the TE signal of a DVD system is in triangular waveform). FIG. 1 is diagram showing the waveforms of TEZC and RFZC signals derived from the zero-crossing of the TE and RFRP signals. A complete high/low cycle of the TEZC signal indicates that an optical pick-up head jumps across one track. In general, the optical storage device utilizes the TEZC and RFZC signals to compute the number of tracks jumped by the optical pick-up head. In addition, the TEZC and RFZC signal can be utilized to control the jumping speed of the optical pick-up head.

Figure 2:
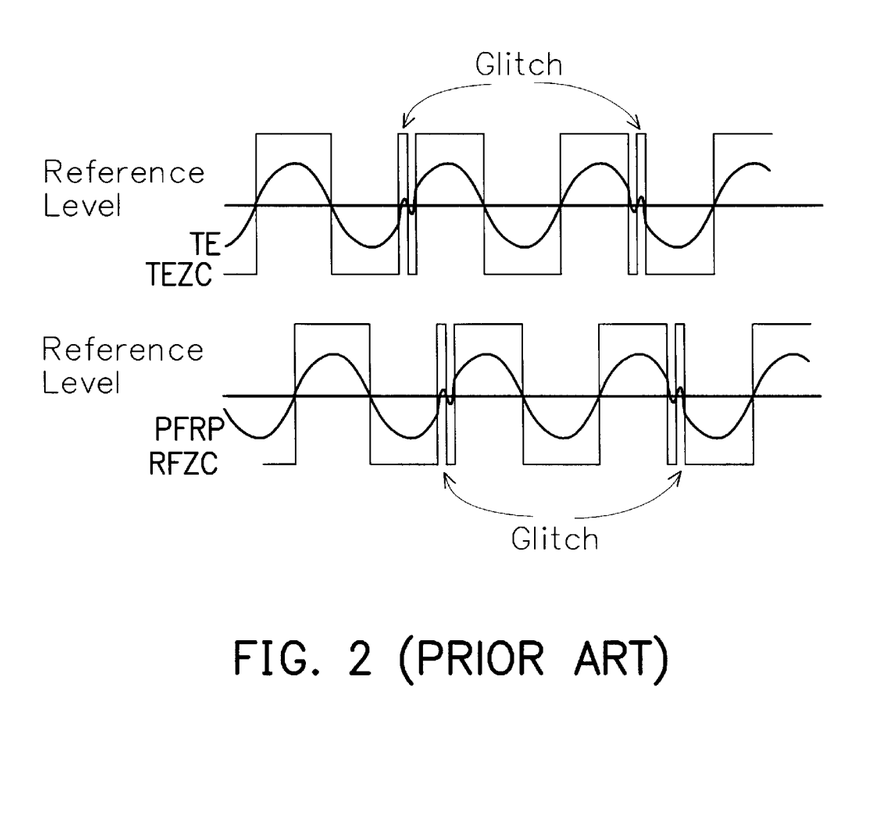
FIG. 2 is a diagram showing the waveforms of TEZC and RFZC signals with distortion.

FIG. 2 is a diagram showing the waveforms of TEZC and RFZC signals due to some distortion of the TE and RFRP signals. Because of some intrinsic problems of the TE and RFRP signals or some external interference, glitches are often generated leading to the formation of abnormal signal fluctuation. Consequently, the TEZC signal and the RFZC signal also contain a number of glitches. These glitches in the TEZC and RFZC signals are error signals that need to be removed or reduced. If these glitches remain in the TEZC or RFZC signals, an abnormal operation may occur in the optical storage device.

To resolve the 'glitch' issue, conventional method relies on referencing both the TEZC signal and the RFZC signal. Under this cross-referencing scheme, whenever a transition has occurred in one of the two signals, the other signal is checked to see if similar transition has also occurred. For example, if there is a state transition of the TEZC signal, another state transition of the TEZC signal is impossible until a state transition of the RFZC signal occurs. Similarly, if there is a state transition of the RFZC signal, another state transition of the RFZC signal is impossible until a state transition of the TEZC signal occurs.

Figure 3:
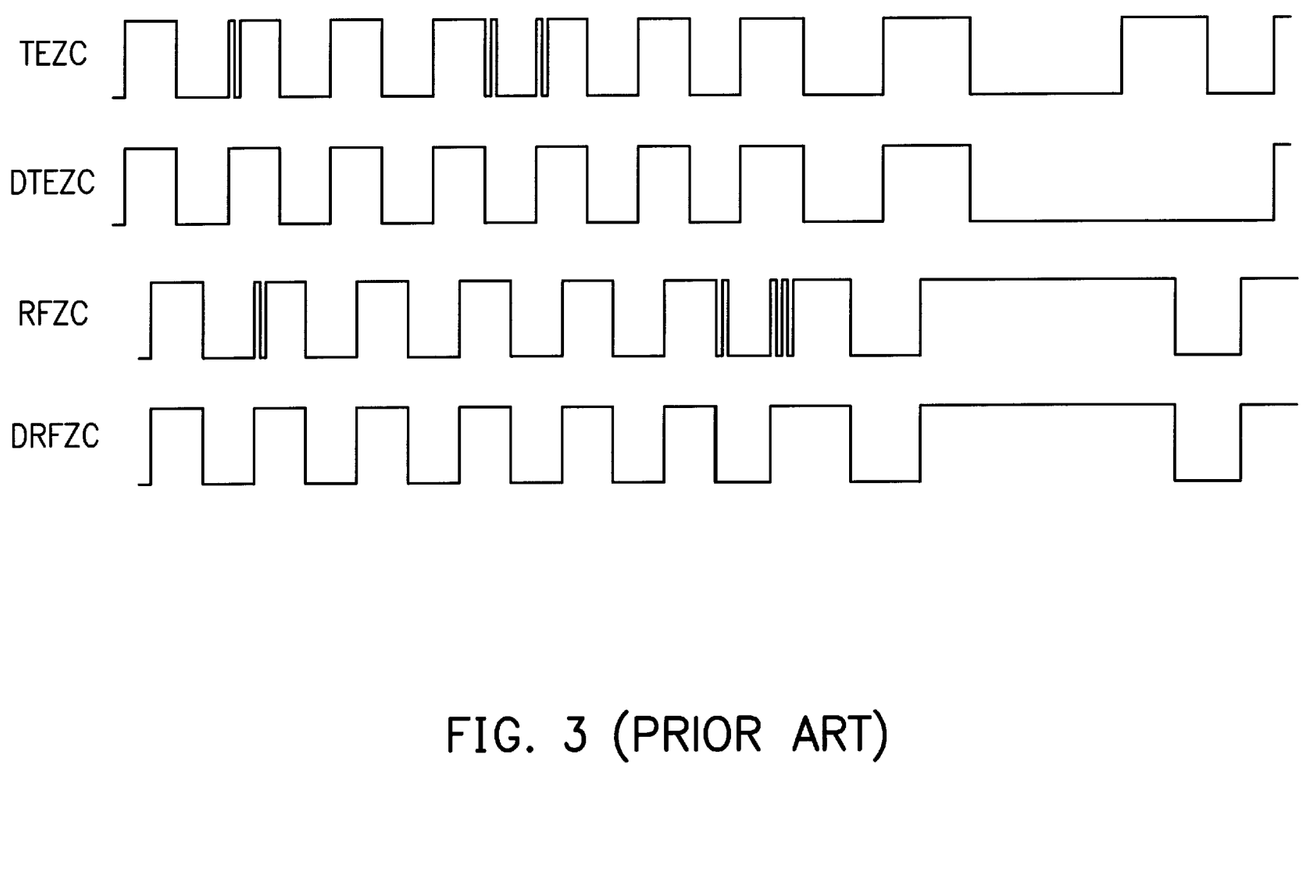
FIG. 3 is a diagram showing the glitch-contained TEZC and RFZC signals and de-glitch DTEZC and DRFZC signals after mutual referencing.

FIG. 3 is a diagram showing the glitch-contained TEZC and RFZC signal waveform and their de-glitch DTEZC and DRFZC signal waveform after mutual referencing.

Despite the capacity for removing glitches contained in the TEZC and RFZC signal, the conventional solution of mutual referencing has some drawbacks, including: (1) When a glitch is simultaneously produced in the TEZC signal and the RFZC signal, the glitch remains; (2) If state transition of either the TEZC signal or the RFZC signal does not occur, neither does the state transition of the TEZC signal or the RFZC signal; (3) The glitch signal often leads to a change in duty cycle; (4) The relationship of a 90° phase angle difference between the TE signal and the RFRP signal is gradually changed when operating at a high operating speed, and the signals cannot be corrected when the signals are dangerously close together.

SUMMARY OF THE INVENTION

Accordingly, one object of the present invention is to provide a track seeking and track locking method capable of keeping the TEZC signal and the RFZC signal unchanged within a computed interval.

A second object of this invention is to provide a track seeking and track locking method capable of preventing the interference of the TEZC and the RFZC signal by glitches, thereby reducing track errors and speed computational errors.

To achieve these and other advantages in accordance with the purpose of the invention, as embodied and broadly described herein, the invention provides a track seeking and track locking method. De-glitch track error zero cross (DTEZC) signal is provided. When the DTEZC signal undergoes a state transition, a first safety time interval and a second safety time interval are generated. In addition, de-glitch radio frequency zero cross (DRFZC) signal is provided. When the DRFZC signal undergoes a state transition, a third safety time interval and a fourth safety time interval are generated. As soon as TEZC signal undergoes a state transition, the DTEZC signal also undergoes a state transition. However, the DTEZC signal will not follow any state transition of the TEZC signal within the first safety time interval and the third safety time interval. Yet, outside the first safety time interval and the third safety time interval, the DTEZC signal and the TEZC signal are in identical state. Similarly, as soon as RFZC signal undergoes a state transition, the DRFZC signal also undergoes a state transition. However, the DRFZC signal will not follow any state transition of the RFZC signal within the second safety time interval and the fourth safety time interval. Yet, outside the second safety time interval and the fourth safety time interval, the DRFZC signal and the RFZC signal are in identical state.

The invention further provides a track seeking and track locking method in an optical storage device. It first provides a first track-cross signal and a second track-cross signals, wherein a phase difference exists between the first and the second track-cross signals. A first and a second protection windows are then set in response to a state change in the first track-cross signal, and a third and a fourth protection windows are set in response to a state change in the second track-cross signal. A third and a fourth track-cross signals are generated according to the first and the second track-cross signals, and the first, the second, the third and the fourth protection windows. During the first and the third protection windows, the state of the third track-cross signal keeps; otherwise, the third track-cross signal is related to the first track-cross signal. Meanwhile, during the second and the fourth protection windows, the state of the fourth track-cross signals keeps; otherwise, the fourth track-cross signal is related to the second track-cross signal.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

The track seeking and track locking method used in an optical storage device is disclosed in this invention. A protection interval can be dynamically computed according to previously generated TEZC and RFZC signals. When newly generated DTEZC signal and DRFZC signal change state, a protection interval is provided to prevent a transition in the DTEZC signal and the DRFZC signal caused by the glitch-infected TEZC and RFZC signals.

Figure 4:
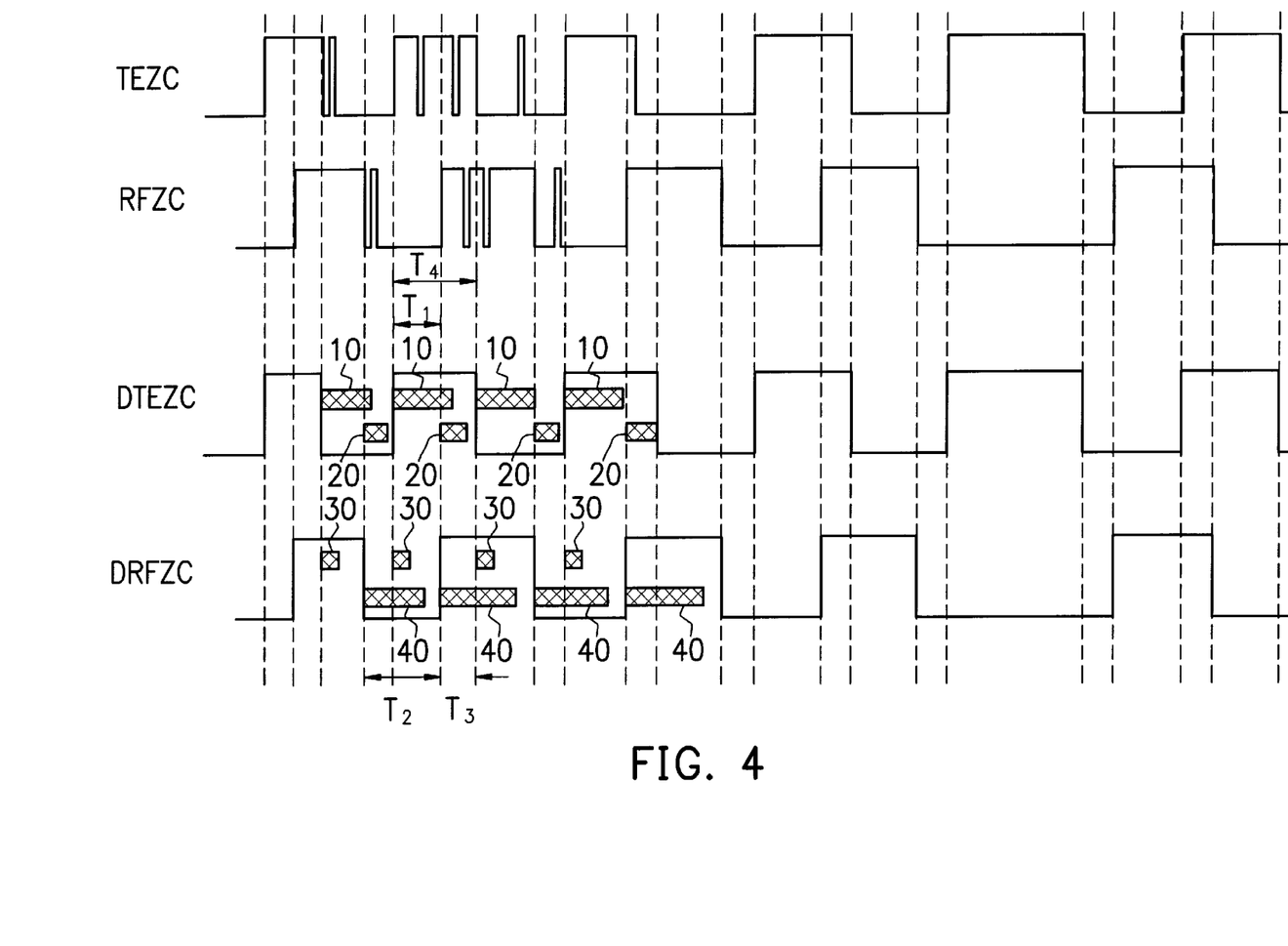
FIG. 4 is a diagram showing the waveforms of the glitch-contained TEZC and RFZC signals and the de-glitch DTEZC and DRFZC signals according to this invention.

FIG. 4 is a diagram showing the waveforms of the glitch-contained TEZC signal and RFZC signal and the waveforms of the de-glitch DTEZC signal and DRFZC signal according to this invention.

In principle, the track seeking and track locking method of this invention is activated according to the TEZC signal and the RFZC signal. When the DTEZC signal changes state, a first protection interval 10 and a second protection interval 30 are computed. Within the first protection interval 10 and a third protection interval 20, the DTEZC signal does not change state. However, outside the first protection interval 10 and the third protection interval 20, the DTEZC and TEZC signals are in the same state.

Similarly, when the DRFZC signal changes state, the third protection interval 20 and a fourth protection interval 40 are computed. Within the second protection interval 30 and the fourth protection interval 40, the DRFZC signal does not change state. However, outside the second protection interval 30 and the fourth protection interval 40, the DRFZC signal and RFZC signals are in the same state.

For example, when the DRFZC state changes from a low level to a high level as shown in FIG. 4, half of the period $T_1$ ($T_1/2$) maintained by the DTEZC signal at the high level is chosen as the third protection interval 20. In the meantime, three-quarter of the period $T_2$ ($¾T_2$) maintained by the DRFZC signal in the previous low level interval is chosen as the fourth protection interval 40. On the other hand, when the DTEZC state changes from a high level to a low level, half of the period $T_3$ ($T_3/2$) maintained by the DRFZC signal is chosen as the second protection interval 30. Similarly, three-quarter of the low-level period $T_4$ ($¾T_4$) of the previous DTEZC signal is chosen as the first protection interval 10.

In the aforementioned scheme, those protection intervals are set according actual TEZC and RFZC signal states. In addition, a few of the previous cycles of the TEZC signal and RFZC signal may be utilized for a dynamical adjustment. Ultimately, glitches in the TEZC and the RFZC signal are removed from the DTEZC and DRFZC signals.

Figure 5:
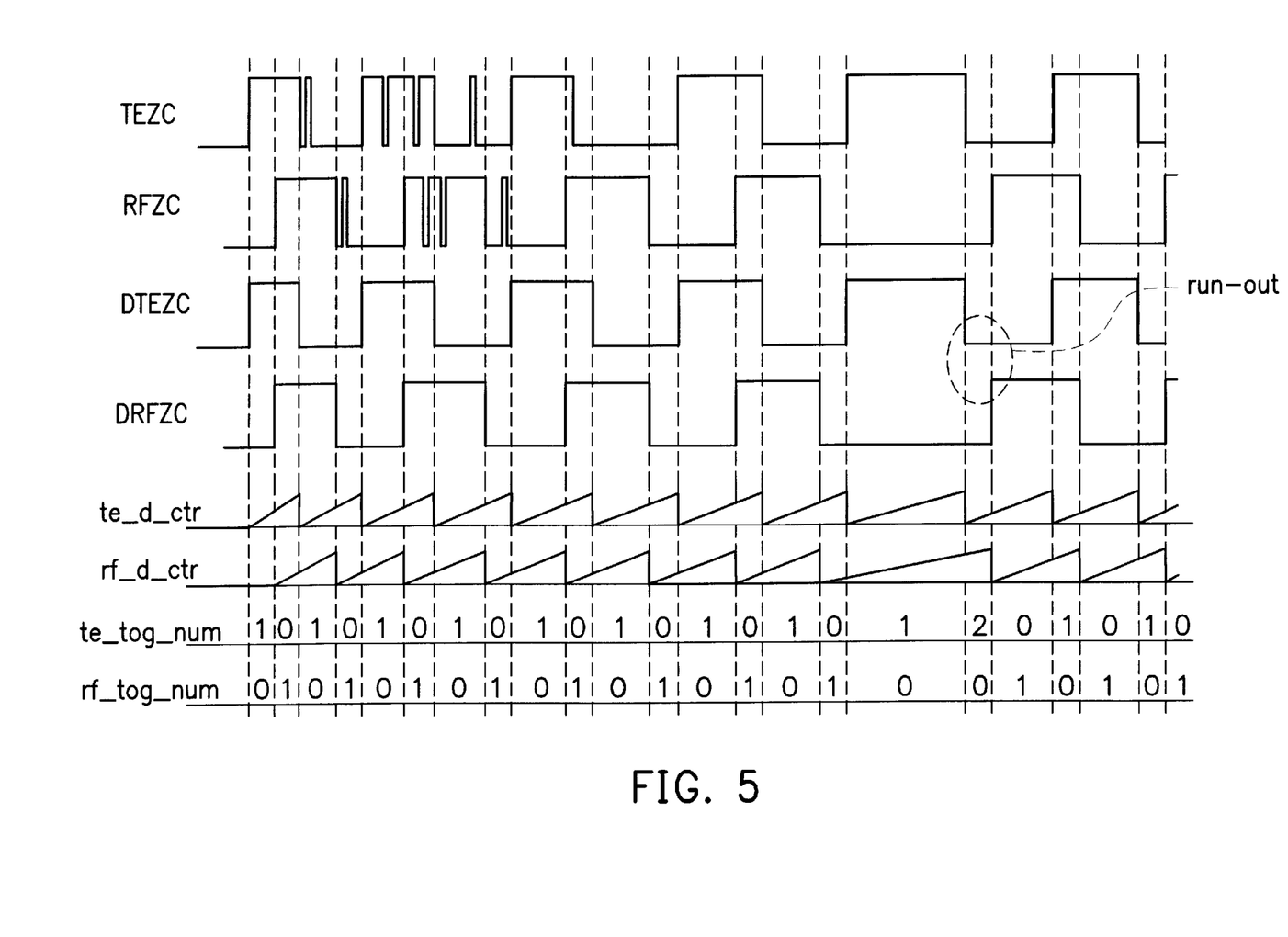
FIG. 5 is a diagram showing the waveforms of the TEZC signal, the RFZC signal, the DTEZC signal, the DRFZC signal as well as the waveforms of four parameters te_d_ctr, rf_d_ctr, te_tog_num and rf_tog_num.

The following is a description of another method of finding the protection interval. FIG. 5 is a diagram showing the waveforms of the TEZC signal, RFZC signal, DTEZC signal, DRFZC signal as well as the waveforms of four parameters te_d_ctr, rf_d_ctr, te_tog_num and rf_tog_num.

As shown in FIG. 5, te_d_ctr is used for computing the number of pulses when the DTEZC signal is kept at the same level by referencing a fast clock signal. Moreover, the te_d_ctr is reset to zero once the DTEZC signal changes state. Note that the fast clock signal has a frequency much higher than that of the DTEZC signal.

Similarly, rf_d_ctr is used for computing the number of pulses when the DRFZC signal is kept at the same level by referencing a fast clock signal. The rf_d_ctr is reset to zero once the DRFZC signal changes state.

Meanwhile, the te_tog_num and the rf_tog_num both refer to the DTEZC and the DRFZC signals. When the DTEZC signal changes state, 1 is added to the te_tog_num. When the DRFZC signal changes state, the te_tog_num is reset to zero. Similarly, when the DRFZC signal changes state, 1 added to the rf_tog_num. When the DTEZC signal changes state, the rf_tog_num is reset to zero. Hence, the te_tog_num and rf_tog_num mostly change between 1 and zero. Only when the optical pickup head runs out, the te_tog_num will reach.

In FIG. 5, in the run-out state of the optical pickup head, the DTEZC and the DRFZC signals change phases. According to FIG. 5, during some intervals, the DTEZC signal leads the DRFZC signal by 90°. However, after the run out of the pickup head, the DRFZC signal leads the DTEZC signal by 90°. At this moment, the protection interval is computed according to the te_tog_num and the rf_tog$_{13}$ num.

According to the value te_tog_num and rf_tog_num, the te_d_ctr and rf_d_ctr, four protection intervals are obtained.

First protection interval=a×te_d_ctr value+b×rf_d_ctr value;

Second protection interval=c×te_d_ctr value+d×rf_d_ctr value;

Third protection interval=e×te_d_ctr value+f×rf_d_ctr value;

Fourth protection interval=g×te_d_ctr value+h×rf_d_ctr value.

In the above formulae, the values for a, b, c, d, e, f, g and h can be determined by the actual state of the TEZC and RFZC signal and the te_tog_num and the rf_tog_num.

Figure 6:
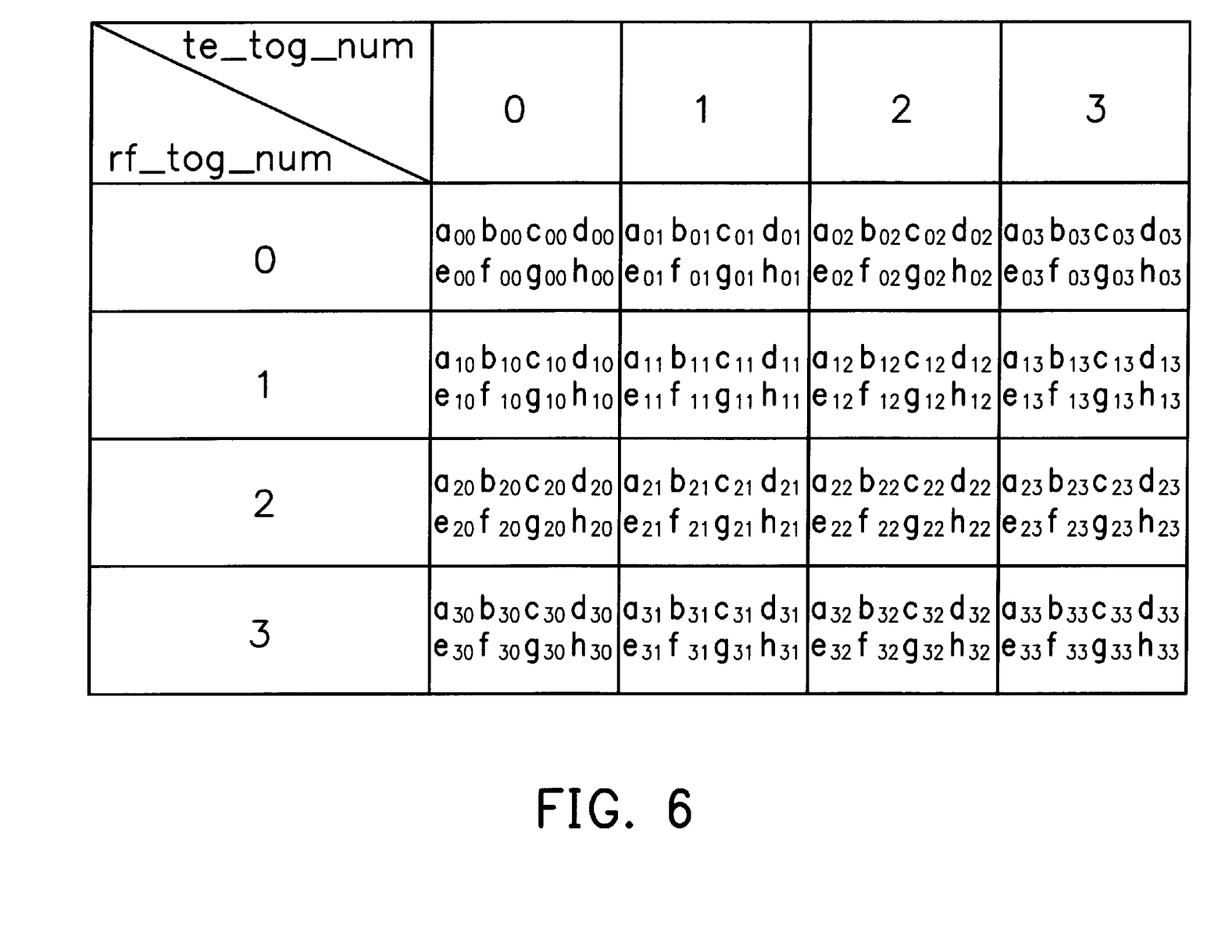
FIG. 6 is a table listing out the parameters a, b, c, d, e, f, g and h according to the te_tog_num and the rf_tog_num counter.

FIG. 6 is a table listing out the relationship between factors a, b, c, d, e, f, g and h and the te_tog_num and the rf_tog_num. In the normal operating state, the rf_tog_num and the te_tog_num are 0,1 or 1,0. Taking $a_{01}$, $b_{01}$, $c_{01}$, $d_{01}$, $e_{01}$, $f_{01}$, $g_{01}$ and $h_{01}$ or $a_{10}$, $b_{10}$, $c_{10}$, $d_{10}$, $e_{10}$, $f_{10}$, $g_{10}$ and $h_{10}$ into the above formulae, the protection intervals are obtained. When run out of the pickup head occurs, the rf_tog_num and the te_tog_num counter are 0,2 or 2,0. Taking $a_{02}$, $b_{02}$, $c_{02}$, $d_{02}$, $e_{02}$, $f_{02}$, and $h_{02}$ or $a_{20}$, $b_{20}$, $c_{20}$, $d_{20}$, $e_{20}$, $f_{20}$, $g_{20}$ and $h_{20}$ into the above formulae, the protection intervals are obtained. Hence, there are no error signals in the DTEZC and the DFRZC signals.

Figure 7:
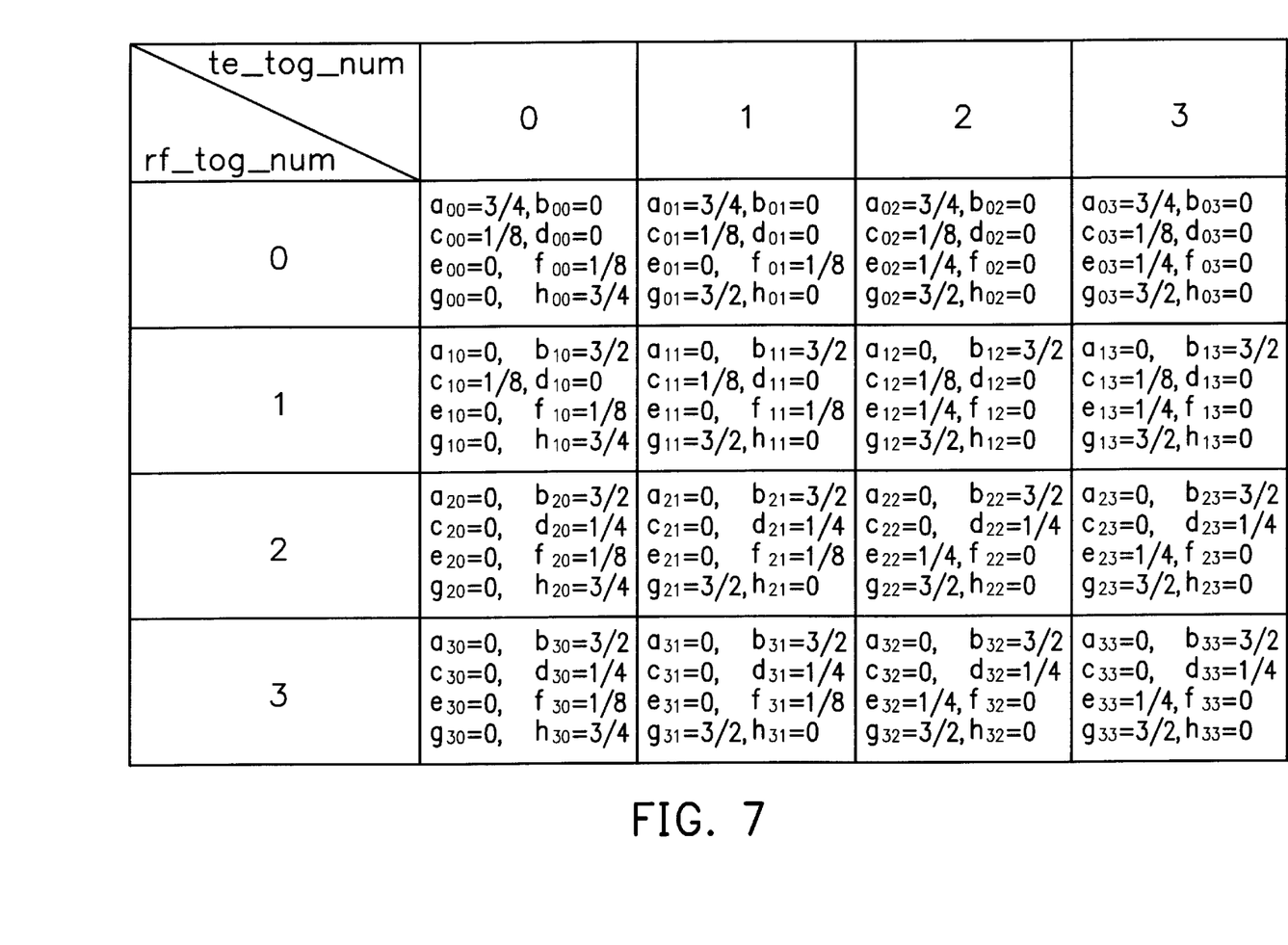
FIG. 7 is a table list showing an example of the parameters listed in FIG. 6.

FIG. 7 is a table list showing an example of the parameters listed in FIG. 6. In the table, both the te_tog_num and the rf_tog_num are from 0 to 3. Under such conditions, various results are obtained in the table for reference.

In brief, in the track seeking and track locking method of the invention, (1) even if glitches are simultaneously produced in the TEZC signal waveform and the RFZC signal waveform, the glitch can be removed; (2) if either the TEZC signal or the RFZC signal keeps state, state transition of the other signal can still occur; moreover, glitches can still be effectively eliminated; (3) change in duty cycle due to the glitches is reduced; (4) a 90° phase difference between the TE signal and the RFRP signal can be maintained even at a high operating speed.

Hence, one of the advantages of the present invention is to provide a track seeking and track locking method capable of providing protection intervals such that any state transition of the TEZC signal and the RFZC signal within the protection interval is prohibited.

Another advantage of this invention is to provide a track seeking and track locking method capable of preventing glitches in the TE signal and the RFRP signal from interfering the TEZC signal and the RFZC signal, thus reducing track errors.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A track seeking and track locking method in an optical storage device, comprising steps of:
   providing a first track-cross signal and a second track-cross signals, wherein a phase difference exists between the first and the second track-cross signals;
   providing a third track-cross signal, wherein a first protection interval and a second protection interval are obtained according to a state change of the third track-cross signal;
   providing a fourth track-cross signal, wherein a third protection interval and a fourth protection interval are obtained according to a state change of the fourth track-cross signal;
   maintaining the current state of the third track-cross signal within the first and the third protection intervals;
   making the state of the third track-cross signal referring to the first track-cross signal during other than the first and the third protection intervals;
   maintaining the current state of the fourth track-cross signal within the second and the fourth protection intervals; and
   making the state of the fourth track-cross signal referring to the second track-cross signal during other than the second and the protection intervals.

2. The method of claim 1, wherein a first and a second parameters are provided to respectively count pulse numbers of the third and the fourth track-cross signals when the third and the fourth track-cross signals are respectively kept at the same levels by referencing a fast clock signal.

3. The method of claim 1, wherein the first, the second, the third and the fourth protection intervals are adjusted according to previous cycles of the first and the second track-cross signals.

4. The method of claim 1, wherein a third and a fourth parameters are provided to record transient status of the third and the fourth track-cross signals, wherein
   adding 1 to the third parameter when the third signal changes state, and resetting the third parameter to 0 when the fourth track-cross signal changes state; and
   adding 1 to the fourth parameter when the fourth track-cross signal changes state, and resetting the fourth parameter to 0 when the third track-cross signal changes state.

5. The method of claim 4, wherein the first, the second, the third and the fourth protection intervals are calculated by performing a linear combination on the third and the fourth parameters.

6. The method of claim 1, wherein the first track-cross signal is a track error zero cross (TEZC) signal.

7. The method of claim 1, wherein the second track-cross signal is a radio frequency zero cross (RFZC) signal.

8. The method of claim 1, wherein the phase difference between the first track-cross signal and the second track-cross signal is 90°.

9. The method of claim 1, wherein the third track-cross signal is a de-glitch track error zero cross (DTEZC) signal.

10. The method of claim 1, wherein the fourth track-cross signal is a de-glitch radio frequency zero cross (DRFZC) signal.

11. A track seeking and track locking method in an optical storage device, comprising steps of:
   providing a first signal and a second track-cross signals, wherein a phase difference exists between the first and the second track-cross signals;
   setting a first and a second protection windows in response to a state change in the first track-cross signal;
   setting a third and a fourth protection windows in response to a state change in the second track-cross signal;
   generating a third and a fourth track-cross signals according to the first and the second track-cross signals, and the first, the second, the third and the fourth protection windows, wherein during the first and the third protection windows, the state of the third track-cross signal keeps; otherwise, the third track-cross signal is related to the first track-cross signal; and during the second and the fourth protection windows, the state of the fourth track-cross signals keeps; otherwise, the fourth track-cross signal is related to the second track-cross signal.

12. The method of claim 11, wherein a first and a second parameters are provided to respectively count pulse numbers of the third and the fourth track-cross signals when the third and the fourth track-cross signals are respectively kept at the same levels by referencing a fast clock signal.

13. The method of claim 12, wherein a third and a fourth parameters are provided to record transient status of the third and the fourth track-cross signals, wherein adding 1 to the third parameter when the third signal changes state, and reseting the third parameter to 0 when the fourth track-cross signal changes state; and adding 1 to the fourth parameter when the fourth signal changes state, and reseting the fourth parameter to 0 when the third track-cross signal changes state.

14. The method of claim 13, wherein the first, the second, the third and the fourth protection windows are calculated by performing a linear combination on the third and the fourth parameters.

15. The method of claim 11, wherein the first, the second, the third and the fourth protection windows are adjusted according to previous cycles of the first and the second track-cross signals.

16. The method of claim 11, wherein the first track-cross signal is a track error zero cross (TEZC) signal.

17. The method of claim 11, wherein the second track-cross signal is a radio frequency zero cross (RFZC) signal.

18. The method of claim 11, wherein the phase difference between the first track-cross signal and the second track-cross signal is 90°.

19. The method of claim 11, wherein the third track-cross signal is a de-glitch track error zero cross (DTEZC) signal.

20. The method of claim 11, wherein the fourth track-cross signal is a de-glitch radio frequency zero cross (DRFZC) signal.

* * * * *